(12) United States Patent
Lai

(10) Patent No.: US 11,019,700 B2
(45) Date of Patent: May 25, 2021

(54) LED DRIVING SYSTEM AND LED DRIVING DEVICE

(71) Applicant: Novatek Microelectronics Corp., Hsinchu (TW)

(72) Inventor: Wei-Jen Lai, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/387,539

(22) Filed: Apr. 18, 2019

(65) Prior Publication Data

US 2019/0327808 A1    Oct. 24, 2019

Related U.S. Application Data

(60) Provisional application No. 62/659,152, filed on Apr. 18, 2018.

(51) Int. Cl.
*H05B 45/40*    (2020.01)
*H05B 45/50*    (2020.01)

(52) U.S. Cl.
CPC .............. *H05B 45/40* (2020.01); *H05B 45/50* (2020.01)

(58) Field of Classification Search
CPC .. H05B 33/0821; H05B 33/089; H05B 45/40; H05B 45/50; H05B 45/24; H05B 45/37; H05B 45/10; H05B 45/46
See application file for complete search history.

(56) References Cited

U.S. PATENT DOCUMENTS

| | | | |
|---|---|---|---|
| 6,411,531 B1* | 6/2002 | Nork | H02M 3/073 363/60 |
| 7,459,866 B2 | 12/2008 | Yu et al. | |

(Continued)

FOREIGN PATENT DOCUMENTS

| | | |
|---|---|---|
| CN | 104883793 | 9/2015 |
| CN | 104883793 | 6/2017 |

(Continued)

OTHER PUBLICATIONS

"Search Report of Europe Counterpart Application", dated Oct. 14, 2019, p. 1-p. 8.

(Continued)

*Primary Examiner* — Raymond R Chai
(74) *Attorney, Agent, or Firm* — JCIPRNET

(57) ABSTRACT

A light-emitting diode driving system including a load, a power supply circuit and a light-emitting diode driving device is provided. The load includes one or more light-emitting diode strings. The power supply circuit outputs an output voltage to drive the load according to a feedback signal. The light-emitting diode driving device includes at least one current source, at least one comparator and a control logic circuit. The current source outputs a current to drive the load. The comparator compares a first voltage from the current source to a reference voltage and outputs a second voltage according to a comparison result. The control logic circuit includes a control node. The control logic circuit receives the second voltage through the control node and converts the second voltage to a control signal to adjust a resistance value of a variable resistor circuit. A light-emitting diode driving device is also provided.

13 Claims, 11 Drawing Sheets

(56) References Cited

U.S. PATENT DOCUMENTS

| | | | |
|---|---|---|---|
| 7,973,518 B2 | 7/2011 | Shor et al. | |
| 8,063,585 B2 | 11/2011 | Trattler | |
| 9,461,539 B2 | 10/2016 | Chern et al. | |
| 9,769,888 B2 | 9/2017 | Wang et al. | |
| 2006/0186827 A1* | 8/2006 | Ragonesi | H05B 45/38 315/185 S |
| 2007/0146051 A1* | 6/2007 | Tsen | H05B 45/37 327/536 |
| 2008/0018266 A1* | 1/2008 | Yu | H05B 45/10 315/291 |
| 2013/0002216 A1* | 1/2013 | Kim | G05F 1/565 323/274 |
| 2014/0226118 A1* | 8/2014 | Lee | G02F 1/133377 349/138 |
| 2014/0253842 A1* | 9/2014 | Zhang | H05B 45/37 349/62 |
| 2014/0266118 A1* | 9/2014 | Chern | H02M 3/156 323/283 |
| 2015/0223305 A1* | 8/2015 | Yang | H05B 45/37 315/193 |
| 2016/0366733 A1* | 12/2016 | Wang | H05B 45/50 |

FOREIGN PATENT DOCUMENTS

| | | |
|---|---|---|
| TW | I316781 | 11/2009 |
| TW | I546643 | 8/2016 |

OTHER PUBLICATIONS

"Office Action of Taiwan Counterpart Application," dated Nov. 11, 2019, p. 1-p. 11.

"Office Action of Taiwan Counterpart Application", dated Jun. 18, 2020, p. 1-p. 9.

"Office Action of Taiwan Counterpart Application", dated Feb. 7, 2020, p. 1-p. 9.

\* cited by examiner

LED DRIVING SYSTEM AND LED DRIVING DEVICE

CROSS-REFERENCE TO RELATED APPLICATION

This application claims the priority benefit of U.S. provisional Applications serial no. 62/659,152, filed on Apr. 18, 2018. The entirety of the above-mentioned patent application is hereby incorporated by reference herein and made a part of this specification.

BACKGROUND

Technical Field

The invention generally relates to a driving system and a driving device. More particularly, the invention relates to a light-emitting diode (LED) driving system and an LED driving device.

Description of Related Art

An LED with a low working voltage is capable of actively emitting lights, and has a specific brightness, which may be adjusted through adjusting a voltage or a current, and meanwhile, the LED has advantages of impact resistance, anti-vibration, and a long service life. Therefore, the LED has been widely used in various terminal devices, including automobile headlights, traffic lights, text displays, post boards, and large-screen video display devices, as well as commonly-used in building illuminations and LCD backlights.

With the increasing of LED efficiency and brightness and the reducing of the cost, the LED market has been well developed and gradually become matured. Especially in the field of high-end display, a display platform has a high requirement on the matching of the brightness for a light source, and requires uniform and consistent display colors and brightness, so as to ensure the display effect always looks like new. In addition, due to the demand of a thinner, lighter, brighter, and low power display on the market, micro light emitting diode (micro-LED) display has been considering as a potential way to replace liquid-crystal display (LCD) and organic light-emitting diode (OLED) since micro-LED can bring significant improvements in brightness, color contrast, and energy efficiency compared to LCD and even OLED.

In a related art, the LED driving devices directly transmit an output signal to the power supply circuit. In this case, the output voltage to the LED may quickly increase in a short time, which is not good to the stability of the power supply circuit. In addition, the LED driving devices may erroneously enable a protection function, e.g., a short LED protection function in some cases.

SUMMARY

The invention is directed to an LED driving system and an LED driving device, in which an output voltage for driving LED strings does not suddenly change, and erroneously enabling the protection function can be avoided.

An embodiment of the invention provides a light-emitting diode driving system, including: a first load including one or more light-emitting diode strings; a power supply circuit configured to output an output voltage to drive the first load according to a feedback signal; and a first light-emitting diode driving device including: at least one current source configured to output a current to drive the first load; at least one comparator configured to compare a first voltage from the current source to a reference voltage and output a second voltage according to a comparison result; a control logic circuit including a control node and configured to receive the second voltage through the control node and convert the second voltage to a control signal to adjust a resistance value of a variable resistor circuit, wherein the variable resistor circuit is configured to output the feedback signal according to the control signal.

In an embodiment of the invention, the variable resistor circuit includes at least two resistors coupled in series, and a resistance value of one of the at least two resistors is variable, and the resistor which has a variable resistance value is either disposed in the first light-emitting diode driving device or outside the first light-emitting diode driving device.

In an embodiment of the invention, the at least two resistors include a first resistor and a second resistor coupled in series, and the resistance value of the first resistor is variable, wherein one end of the first resistor is coupled to a first end of the power supply circuit that outputs the output voltage, and the other end of the first resistor is coupled to a second end of the power supply circuit that receives the feedback signal.

In an embodiment of the invention, if any of the first voltage is smaller than the reference voltage, the control logic circuit increases the resistance value of the first resistor by the control signal, and the output voltage increases; and if all of the first voltages are larger than or equal to the reference voltage, the control logic circuit decreases the resistance value of the first resistor by the control signal, and the output voltage decreases.

In an embodiment of the invention, the at least two resistors include a first resistor and a second resistor coupled in series, and the resistance value of the second resistor is variable, wherein one end of the second resistor is coupled to one end of the power supply circuit that receives the feedback signal, and the other end of the second resistor is coupled to a ground voltage.

In an embodiment of the invention, if any of the first voltage is smaller than the reference voltage, the control logic circuit decreases the resistance value of the second resistor by the control signal, and the output voltage increases; and if all of the first voltages are larger than or equal to the reference voltage, the control logic circuit increases the resistance value of the second resistor by the control signal, and the output voltage decreases.

In an embodiment of the invention, the light-emitting diode driving system further including: a second load including one or more light-emitting diode strings; and a second light-emitting diode driving device including: at least one current source configured to output a current to drive the second load; and at least one comparator configured to compare a first voltage from the current source to the reference voltage and output a second voltage according to a comparison result to the control node of the control logic circuit of the first light-emitting diode driving device.

An embodiment of the invention provides a light-emitting diode driving device, including: at least one current source configured to output a current to drive a load, wherein the load includes one or more light-emitting diode strings and is driven by an output voltage outputted by a power supply circuit; at least one comparator configured to compare a first voltage from the current source to a reference voltage and output a second voltage according to a comparison result;

and a control logic circuit including a control node and configured to receive the second voltage through the control node and convert the second voltage to a control signal to adjust a resistance value of a variable resistor circuit, wherein the variable resistor circuit is configured to output a feedback signal according to the control signal to the power supply circuit.

In an embodiment of the invention, the variable resistor circuit includes at least two resistors coupled in series, and a resistance value of one of the at least two resistors is variable, and the resistor which has a variable resistance value is either disposed in the first light-emitting diode driving device or outside the first light-emitting diode driving device.

In an embodiment of the invention, the at least two resistors include a first resistor and a second resistor coupled in series, and the resistance value of the first resistor is variable, wherein one end of the first resistor is coupled to a first end of the power supply circuit that outputs the output voltage, and the other end of the first resistor is coupled to a second end of the power supply circuit that receives the feedback signal.

In an embodiment of the invention, if any of the first voltage is smaller than the reference voltage, the control logic circuit increases the resistance value of the first resistor by the control signal, and the output voltage increases; and if all of the first voltages are larger than or equal to the reference voltage, the control logic circuit decreases the resistance value of the first resistor by the control signal, and the output voltage decreases.

In an embodiment of the invention, the at least two resistors include a first resistor and a second resistor coupled in series, and the resistance value of the second resistor is variable, wherein one end of the second resistor is coupled to one end of the power supply circuit that receives the feedback signal, and the other end of the second resistor is coupled to a ground voltage.

In an embodiment of the invention, if any of the first voltage is smaller than the reference voltage, the control logic circuit decreases the resistance value of the second resistor by the control signal, and the output voltage increases; and if all of the first voltages are larger than or equal to the reference voltage, the control logic circuit increases the resistance value of the second resistor by the control signal, and the output voltage decreases.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
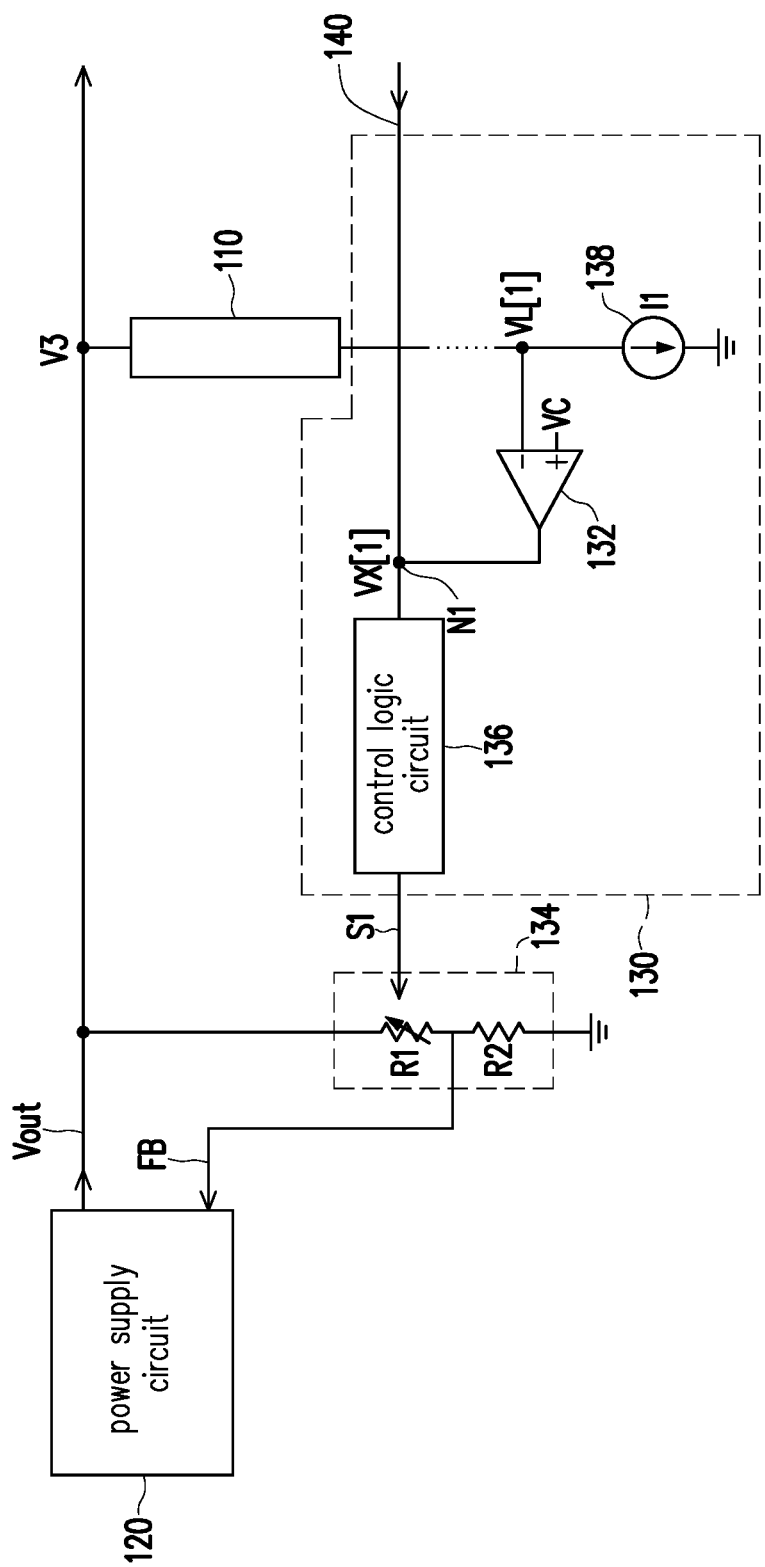
FIG. 1 illustrates a schematic diagram of a light-emitting diode driving system according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments are provided below to describe the disclosure in detail, though the disclosure is not limited to the provided embodiments, and the provided embodiments can be suitably combined. The term "coupling/coupled" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

FIG. 1 illustrates a schematic diagram of a light-emitting diode driving system according to an embodiment of the invention. Referring to FIG. 1, the LED driving system 100 includes a load 110, a power supply circuit 120 and an LED driving device 130. The LED driving device 130 includes a current source 138, a comparator 132, and a control logic circuit 136. The load 110 includes one or more LED strings. The LED driving device 130 drives the LED strings to emit light. In this embodiment, the LED driving system 100 further includes a variable resistor circuit 134, and the variable resistor circuit 134 includes a first resistor R1 and a second resistor R2 coupled in series and one of the at least two resistors is a variable resistor having a variable resistance value. In the exemplary FIG. 1, the variable resistor is the first resistor R1, and the first resistor R1 is disposed in the LED driving device 130 and the second resistor R2 is disposed outside the LED driving device 130. In another embodiment, the second resistor R2 (having constant resistance) represents an equivalent resistor including a resistor outside the LED driving device 130 and another resistor disposed in the LED driving device 130. In another embodiment, the variable resistor circuit 134 including the variable resistor R1 may be disposed outside the LED driving device 130.

To be specific, the power supply circuit 120 may be a DC-to-DC converter. The power supply circuit 120 outputs an output voltage Vout to drive the load 110 according to a feedback signal FB from the LED driving device 130. The current source 138 outputs a current I1 to drive the load 110. The comparator 132 compares a first voltage VL[1] from the current source 138 to a reference voltage VC and outputs a second voltage VX[1] according to a comparison result. The reference voltage VC is an input reference voltage of the comparator 132. The first voltage VL[1] is a voltage associated with the current source 138. The second voltage VX[1] is an output signal of the comparator 132 and indicates logical high or logical low.

The control logic circuit 136 has a control node N1 as an input, and is configured to receive the second voltage VX[1] through the control node N1, convert the second voltage VX[1] to a control signal S1, and output the control signal S1 to the variable resistor circuit 134 to adjust a resistance value of a first resistor R1. The variable resistor circuit 134 is configured to output the feedback signal FB according to the control signal S1 to the power supply circuit 120. The divided voltage of the first resistor R1 and second resistor R2 serves as the feedback signal FB. The divided voltage is outputted to the power supply circuit 120 such that the power supply circuit 120 generates the output voltage Vout according to the feedback signal FB. One end of the first resistor R1 is coupled to a first end of the power supply circuit 120 that outputs the output voltage Vout, and the other end of the first resistor R1 is coupled to a second end of the power supply circuit 120 that receives the feedback signal FB.

In the present embodiment, enough teaching, suggestion, and implementation illustration for the power supply circuit 120 and embodiments thereof may be obtained with reference to common knowledge in the related art.

Figure 2:
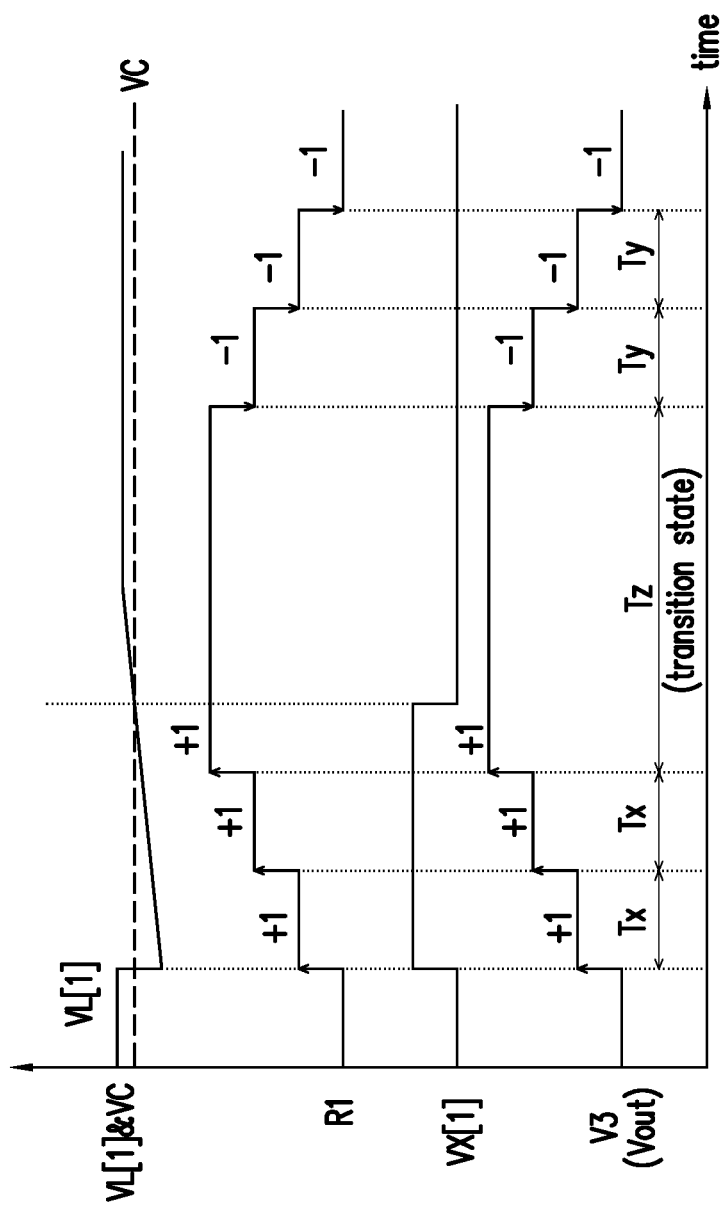
FIG. 2 illustrates a waveform diagram of some signals of the LED driving system depicted in FIG. 1.

FIG. 2 illustrates a waveform diagram of some signals of the LED driving system depicted in FIG. 1. Referring to FIG. 1 and FIG. 2, a third voltage V3 is a voltage of the load side, and the variation tendency of the output voltage Vout is similar to that of the third voltage V3. The resistance value of the first resistor R1 and the output voltage Vout change in a stepwise manner as shown in FIG. 2.

To be specific, if the first voltage VL[1] is smaller than the reference voltage VC, i.e. VL[1]<VC, the comparator 132 outputs the second voltage VX[1] of the logical high, and the control logic circuit 136 increases the resistance value of the first resistor R1 by the control signal S1, such that the output voltage Vout and the third voltage V3 increase. The resistance value of the first resistor R1 and the output voltage Vout increase in the stepwise manner as shown in FIG. 2. The resistance value of the first resistor R1 and the output voltage Vout keep for a first period Tx for each step. In the present embodiment, the increments of the first resistor R1 are substantially the same, and the increments of the third voltage V3 are substantially the same. The increments of the output voltage Vout are substantially the same, and the output voltage Vout does not suddenly rise up such that the power supply circuit 120 may keep in a stable state.

If the first voltage VL[1] is larger than or equal to the reference voltage VC, i.e. VL[1]≤VC, the comparator 132 outputs the second voltage VX[1] of the logical low, and the control logic circuit 136 decreases the resistance value of the first resistor R1 by the control signal S1, such that the output voltage Vout and the third voltage V3 decrease. The resistance value of the first resistor R1 and the output voltage Vout decrease in the stepwise manner as shown in FIG. 2. The resistance value of the first resistor R1 and the output voltage Vout keep for a second period Ty for each step. In the present embodiment, the decrements of the first resistor R1 are substantially the same, and the decrements of the third voltage V3 are substantially the same. The decrement of the output voltage Vout are substantially the same, and the output voltage Vout does not suddenly fall down such that the power supply circuit 120 may keep in a stable state.

In addition, during a transition state that the first voltage VL[1] becomes larger than or equal to the reference voltage VC, the resistance value of the first resistor R1 and the output voltage Vout keep for a third period Tz. The third period Tz is larger than the first period Tx and the second period Ty in the present embodiment. Time periods of the first period Tx, the second period Ty and the third period Tz may be set by users. The control logic circuit 136 may include a counter to count the first period Tx, the second period Ty and the third period Tz.

Figure 3:
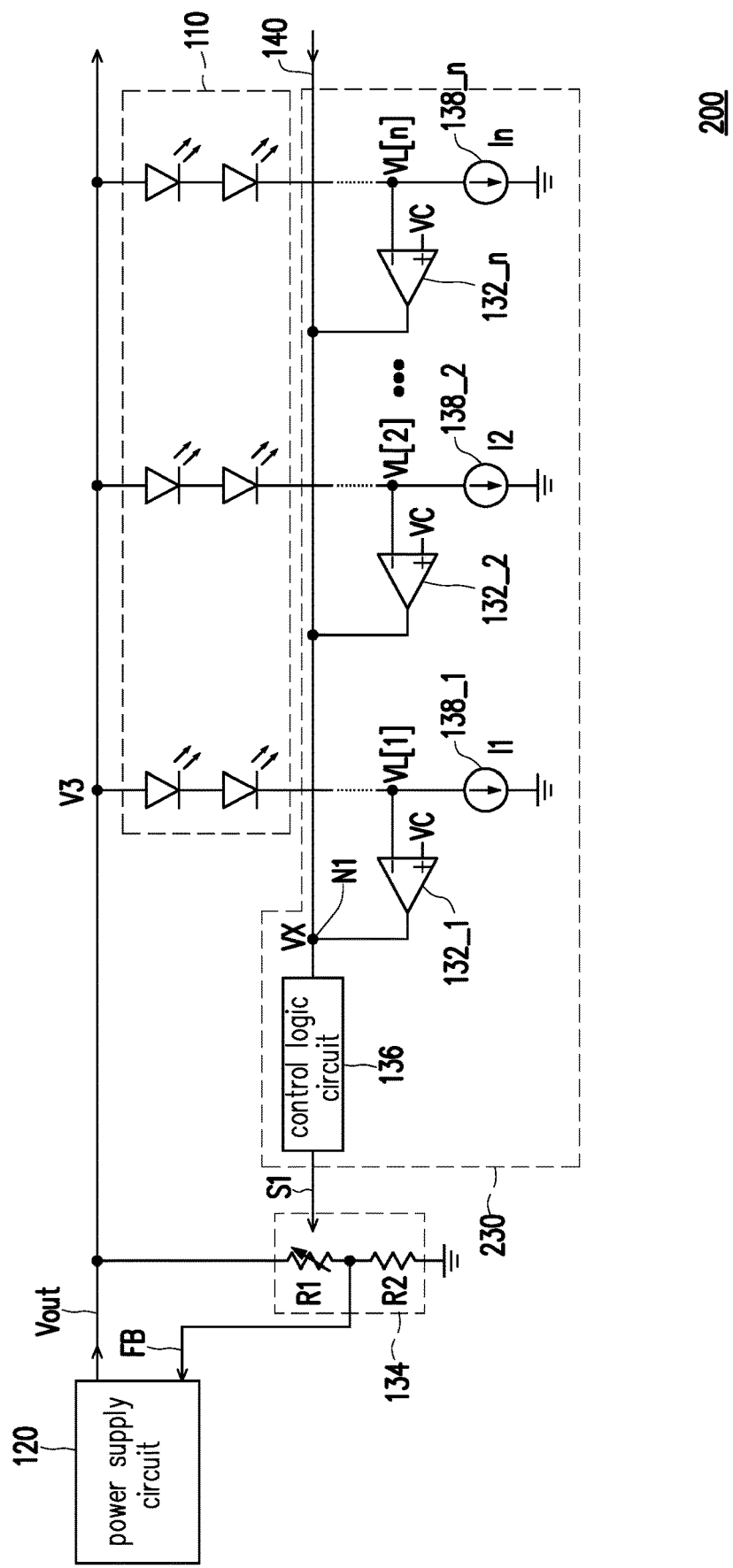
FIG. 3 illustrates a schematic diagram of a light-emitting diode driving system according to another embodiment of the invention.

FIG. 3 illustrates a schematic diagram of a light-emitting diode driving system according to another embodiment of the invention. Referring to FIG. 1 and FIG. 3, the light-emitting diode driving system 200 of the present embodiment is similar to the light-emitting diode driving system 100 depicted in FIG. 1, and the main difference therebetween lies in that the light-emitting diode driving device 230 includes a plurality of current sources 138_1 to 138_n and a plurality of comparators 132_1 to 132_n, where n is a natural number. A control line 140 is coupled to the control node N1.

The current sources 138_1 to 138_n respectively output currents I1 to In to the LED strings of the load 110. Output nodes of the comparators 132_1 to 132_n are coupled to the control line 140 and coupled to the control node N1 of the control logic circuit 136 via the control line 140. The comparators 132_1 to 132_n respectively compare the first voltages VL[1] to VL[n] to the reference voltage VC. Output signals, e.g. the second voltage VX, of the comparators 132_1 and 132_2 to 132_n are outputted to the control logic circuit 136 through the control node N1. The control logic circuit 136 converts the second voltage VX into the control signal S1 that adjusts the resistance value of the first resistor R1.

In the present embodiment, if any first voltage VL[i] (i is from 1 to n) is smaller than the reference voltage VC, the second voltage VX of the logical high is inputted to the control logic circuit 136, and the control logic circuit 136 increases the resistance value of the first resistor R1 by the control signal S1, such that the output voltage Vout and the third voltage V3 increase. If all of the first voltages VL[i] are larger than or equal to the reference voltage VC, the second voltage VX of the logical low is inputted to the control logic circuit 136, and the control logic circuit 136 decreases the resistance value of the first resistor R1 by the control signal S1, such that the output voltage Vout and the third voltage V3 decrease.

Figure 4:
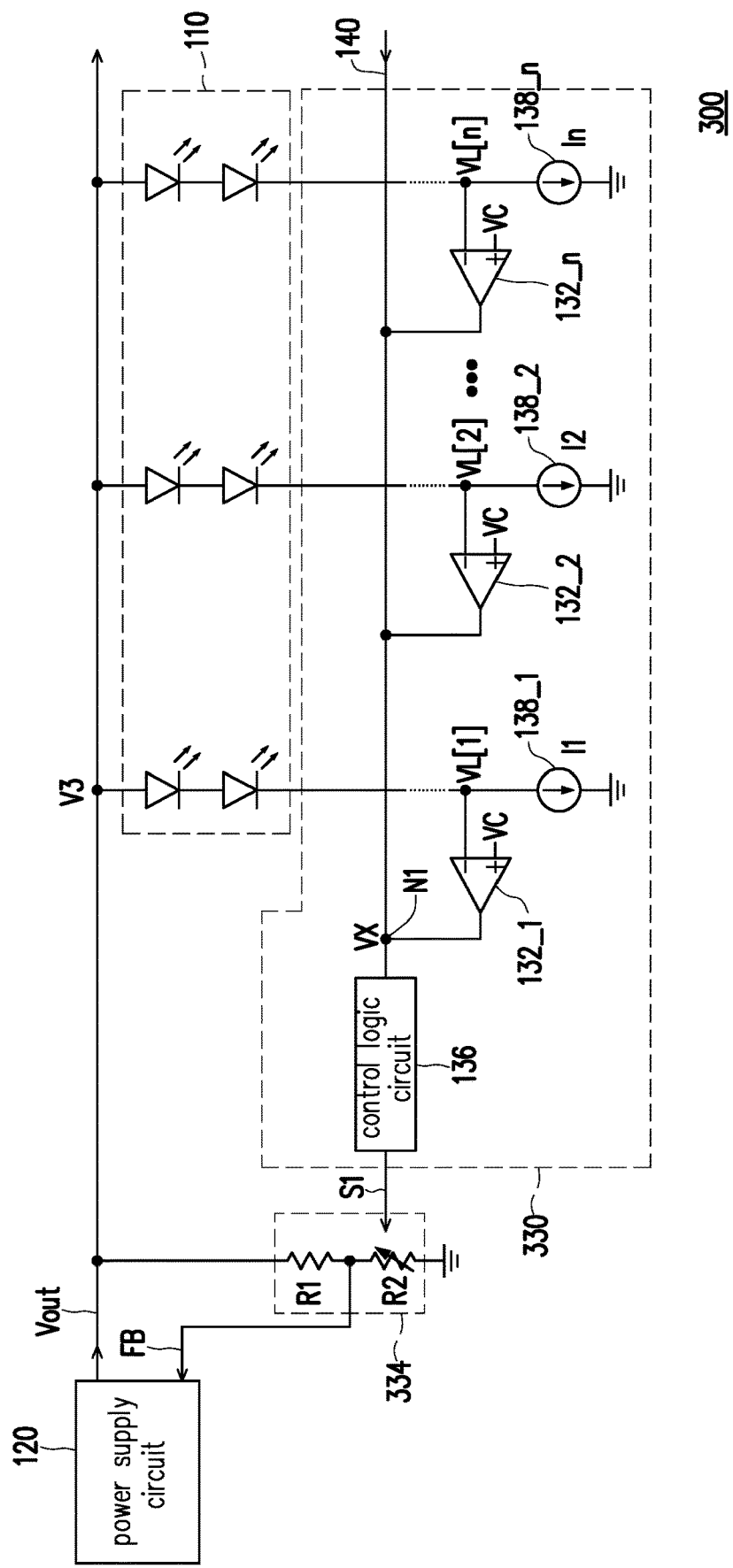
FIG. 4 illustrates a schematic diagram of a light-emitting diode driving system according to another embodiment of the invention.

FIG. 4 illustrates a schematic diagram of a light-emitting diode driving system according to another embodiment of the invention. Referring to FIG. 3 and FIG. 4, the light-emitting diode driving system 300 of the present embodiment is similar to the light-emitting diode driving system 200 depicted in FIG. 3, and the main difference therebetween lies in that the second resistor R2 of the variable resistor circuit 334 is a variable resistor, and a resistance value of the second resistor R2 is variable. In this embodiment illustrated in FIG. 4, the second resistor R2 is disposed in the LED driving device 330 and the first resistor R1 is disposed outside the LED driving device 330; or, the first resistor R1 represents an equivalent resistor which includes a resistor disposed outside the LED driving device 330 and another resistor disposed in the LED driving device 330. In another embodiment, the variable resistor circuit 334 including the variable resistor R2 may be disposed outside the LED driving device 330.

The control logic circuit 136 converts the second voltage VX on the control node N1 into the control signal S1 that adjusts the resistance value of the second resistor R2. In the present embodiment, if any first voltage VL[i] is smaller than the reference voltage VC, the second voltage VX of the logical high is inputted to the control logic circuit 136, and the control logic circuit 136 decreases the resistance value of the second resistor R2 by the control signal S1, such that the output voltage Vout and the third voltage V3 increase. If all of the first voltages VL[i] are larger than or equal to the reference voltage VC, the second voltage VX of the logical low is inputted to the control logic circuit 136, and the control logic circuit 136 increases the resistance value of the second resistor R2 by the control signal S1, such that the output voltage Vout and the third voltage V3 decrease. In the present embodiment, the resistance value of the second resistor R2, the output voltage Vout and the third voltage V3 change in a stepwise manner.

In the embodiments of FIG. 1, FIG. 3 and FIG. 4, the LED driving devices 130, 230, and 330 may be integrated in a single integrated circuit, and the variable resistor (R1 or R2) and the control logic circuit 136 are implemented in the single integrated circuit.

Figure 5:
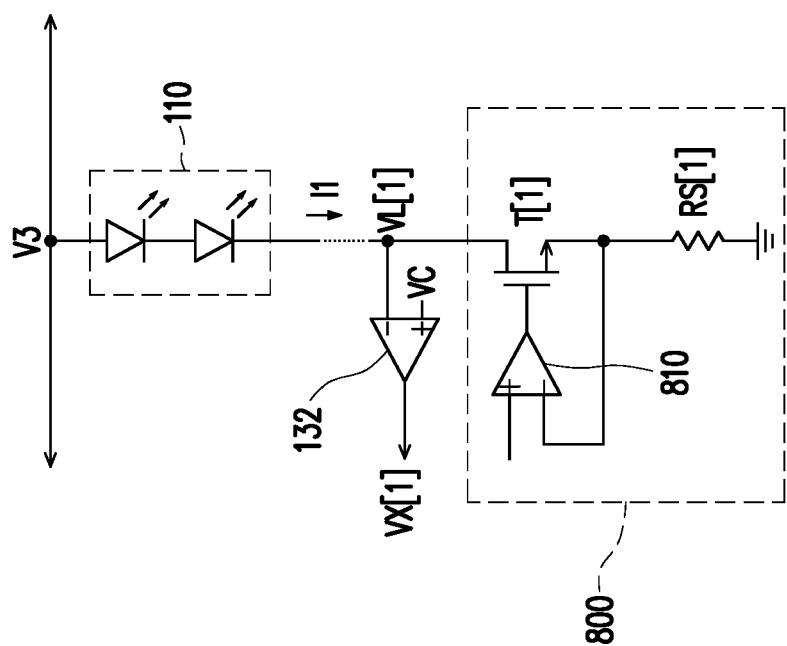
FIG. 5 illustrates a schematic diagram of the current source and the comparator according to an embodiment of the invention.

FIG. 5 illustrates a schematic diagram of the current source and the comparator according to an embodiment of the invention. Referring to FIG. 5, the current source 800 includes an operational amplifier 810, a transistor T[1] and a resistor RS[1]. The comparator 132 may detect a drain voltage of the transistor T[1], i.e. the first voltage VL[1], in the present embodiment.

Figure 6:
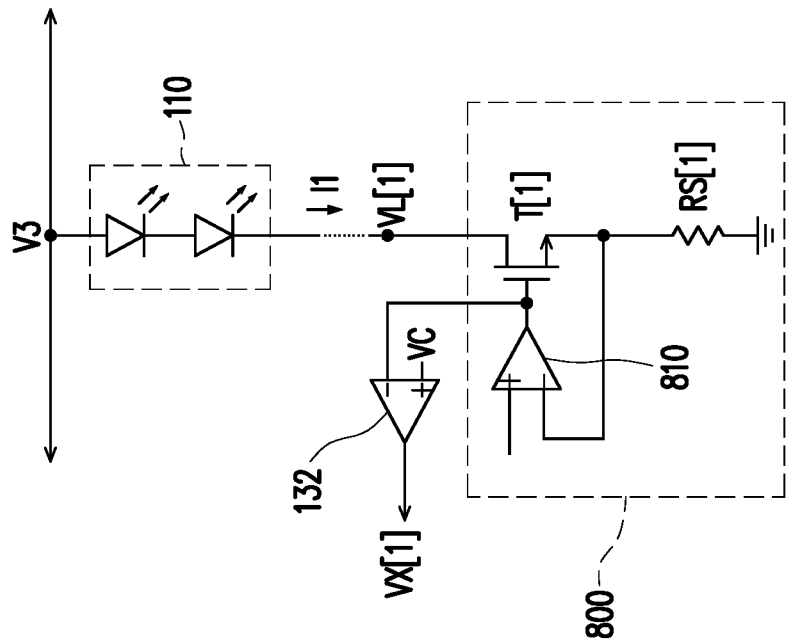
FIG. 6 illustrates a schematic diagram of the current source and the comparator according to another embodiment of the invention.

FIG. 6 illustrates a schematic diagram of the current source and the comparator according to another embodiment of the invention. Referring to FIG. 6, the comparator 132 may detect a gate voltage of the transistor T[1], i.e. the first voltage VL[1], in the present embodiment. Based on FIG. 5 and FIG. 6, the comparator 132 receives the first voltage from the current source 800, and more precisely, from a node which has a voltage that is related to the variation of the voltage V3 of the load side.

Figure 7:
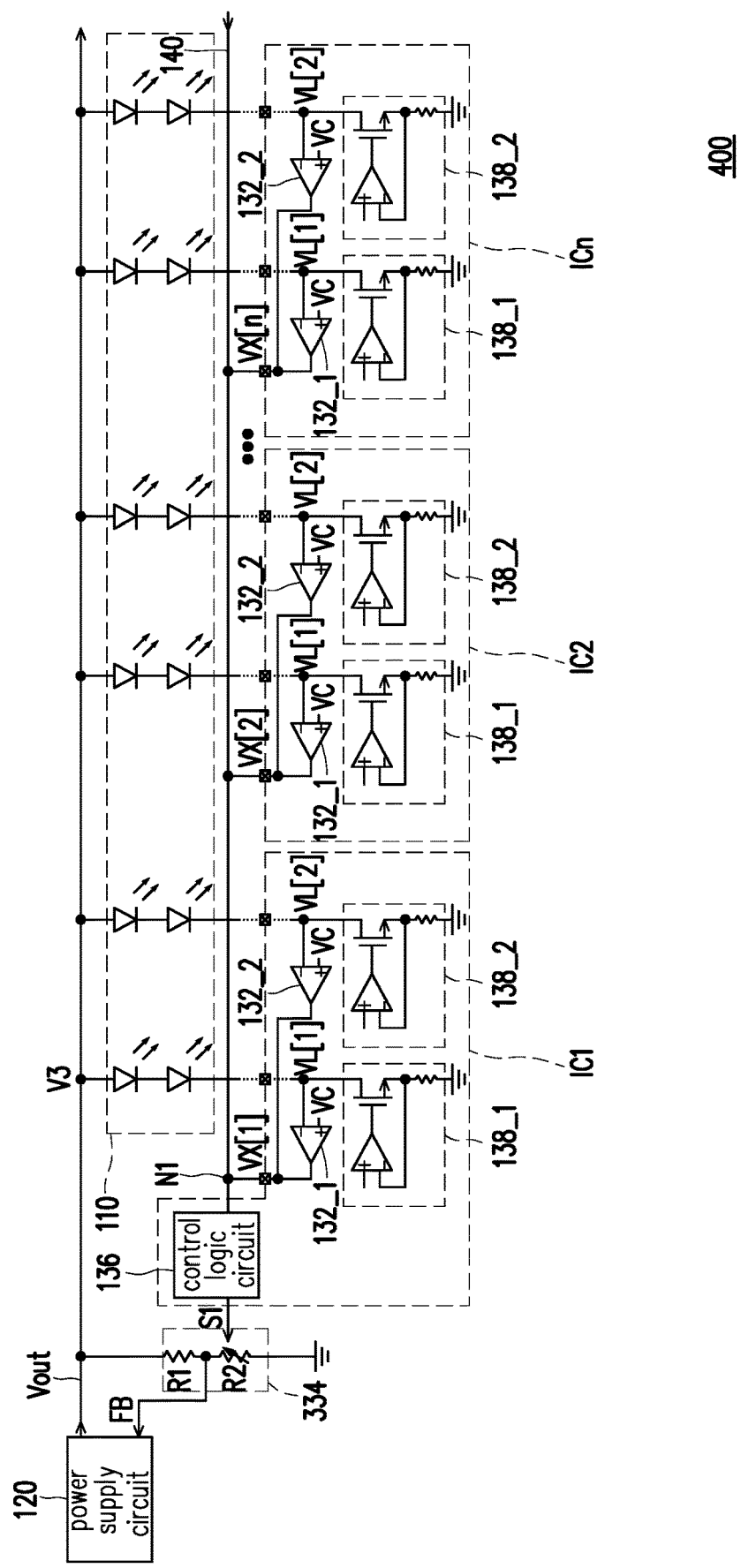
FIG. 7 illustrates a schematic diagram of a light-emitting diode driving system according to another embodiment of the invention.

FIG. 7 illustrates a schematic diagram of a light-emitting diode driving system according to another embodiment of the invention. FIG. 7 illustrates a plurality of LED driving devices IC1 to ICn. Each of IC1 to ICn is implemented as an integrated circuit and may be referred to the LED driving device 330 of FIG. 4. The number of the comparators is two as an example. In this embodiment, each of the LED driving devices IC1 to ICn includes its own control logic circuit 136 but only one LED driving device, which is IC1 as an example, has an active control logic circuit 136 and therefore IC1 is taken as a master driving device. The control logic circuits 136 in other LED driving devices IC2 to ICn may be configured to be inactive such that IC2 to ICn are taken as slave driving devices. The slave LED driving devices IC2 to ICn respectively output the second voltages VX[2] to VX[n] to the control logic circuit 136 of the master LED driving device IC1 via the control line 140 and the control node N1 of the control logic circuit 136 of the master LED driving device IC1.

Figure 8:
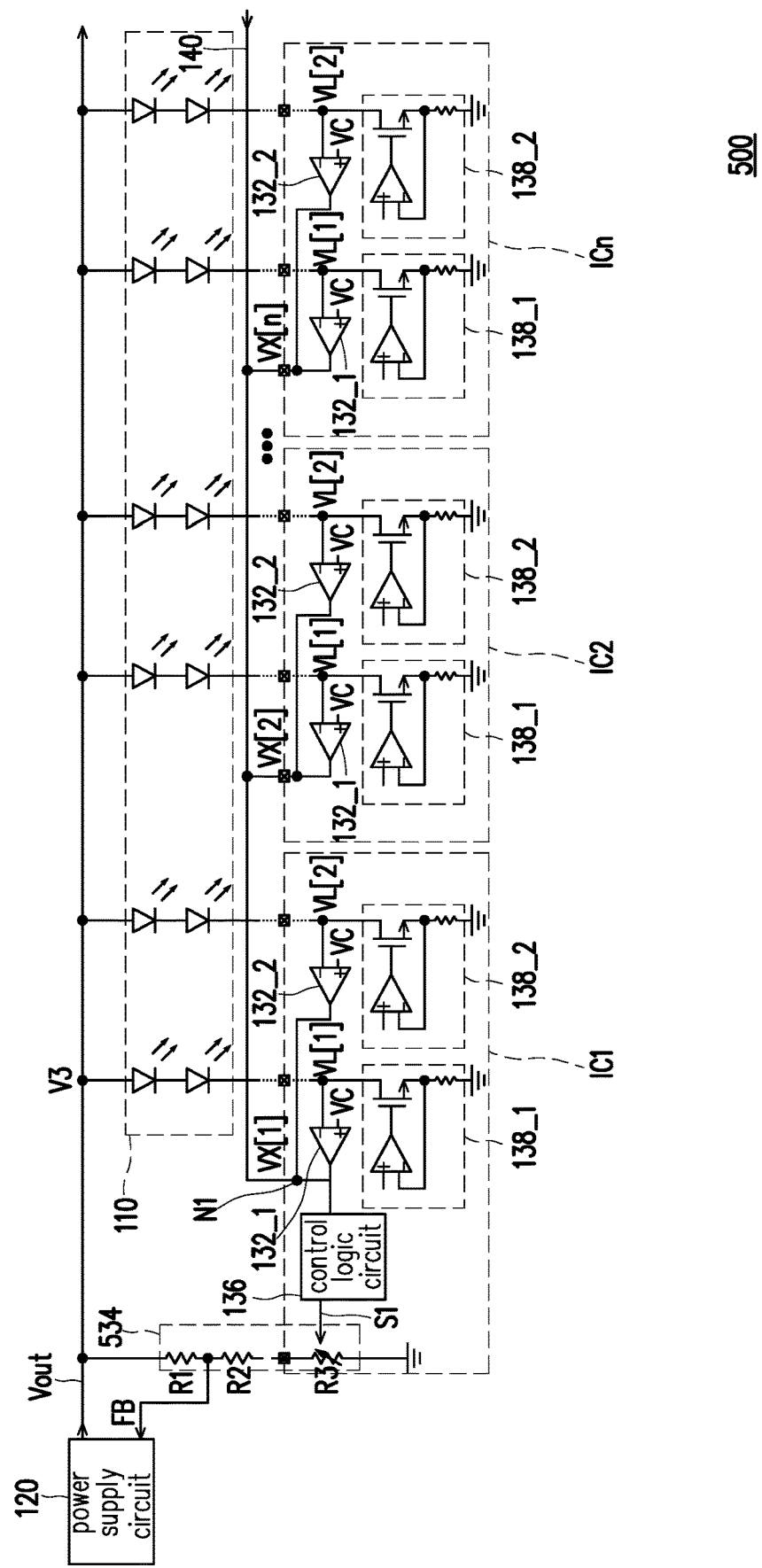
FIG. 8 illustrates a schematic diagram of a light-emitting diode driving system according to another embodiment of the invention.

FIG. 8 illustrates a schematic diagram of a light-emitting diode driving system according to another embodiment of the invention. Referring to FIG. 7 and FIG. 8, the light-emitting diode driving system 500 of the present embodiment is similar to the light-emitting diode driving system 400 depicted in FIG. 7, and the main difference therebetween lies in that the variable resistor circuit 534 includes the first resistor R1, the second resistor R2 and a third resistor R3 coupled in series, and the resistor R3 is a variable resistor disposed in the master LED driving device IC1.

Figure 9:
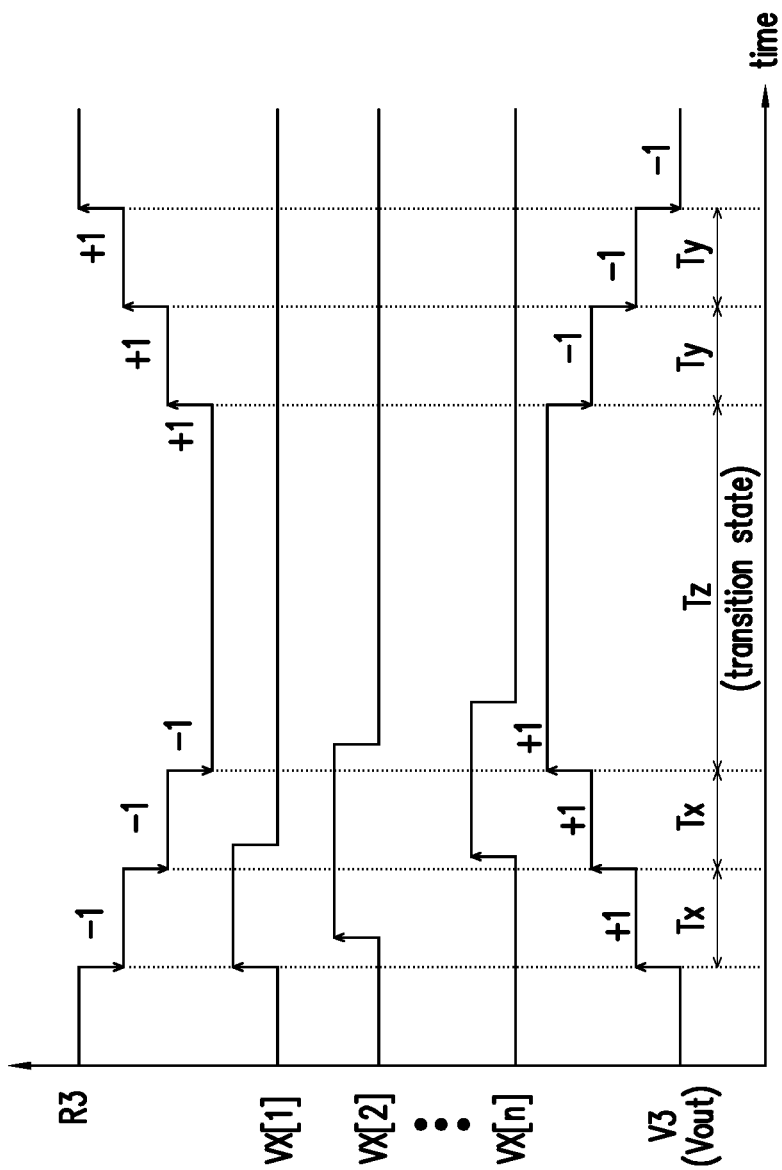
FIG. 9 illustrates a waveform diagram of some signals of the LED driving system depicted in FIG. 8.

FIG. 9 illustrates a waveform diagram of some signals of the LED driving system depicted in FIG. 8. Referring to FIG. 8 and FIG. 9, the resistance value of the third resistor R3, the output voltage Vout and the third voltage V3 change in a stepwise manner as shown in FIG. 9. The control logic circuit 136 converts the second voltages VX[1] to VX[n] into the control signal S1 that adjusts the resistance value of the third resistor R3. The second voltage VX[1] is inputted to the control logic circuit 136 through the control node N1 and the second voltages VX[2] to VX[n] are inputted to the control logic circuit 136 of the master LED driving device IC1 through the control line 140 and the control node N1.

In the present embodiment, if any one of the first voltages VL[1] to VL[n] is smaller than the reference voltage VC, the second voltages VX[1] and VX[2] to VX[n] of the logical high are inputted to the control logic circuit 136, and the control logic circuit 136 decreases the resistance value of the third resistor R3 by the control signal S1, such that the output voltage Vout and the third voltage V3 increase. If all of the first voltages VL[1] to VL[n] are larger than or equal to the reference voltage VC, the second voltages VX[1] to VX[n] of the logical low are inputted to the control logic circuit 136, and the control logic circuit 136 increases the resistance value of the third resistor R3 by the control signal S1, such that the output voltage Vout and the third voltage V3 decrease.

Figure 10:
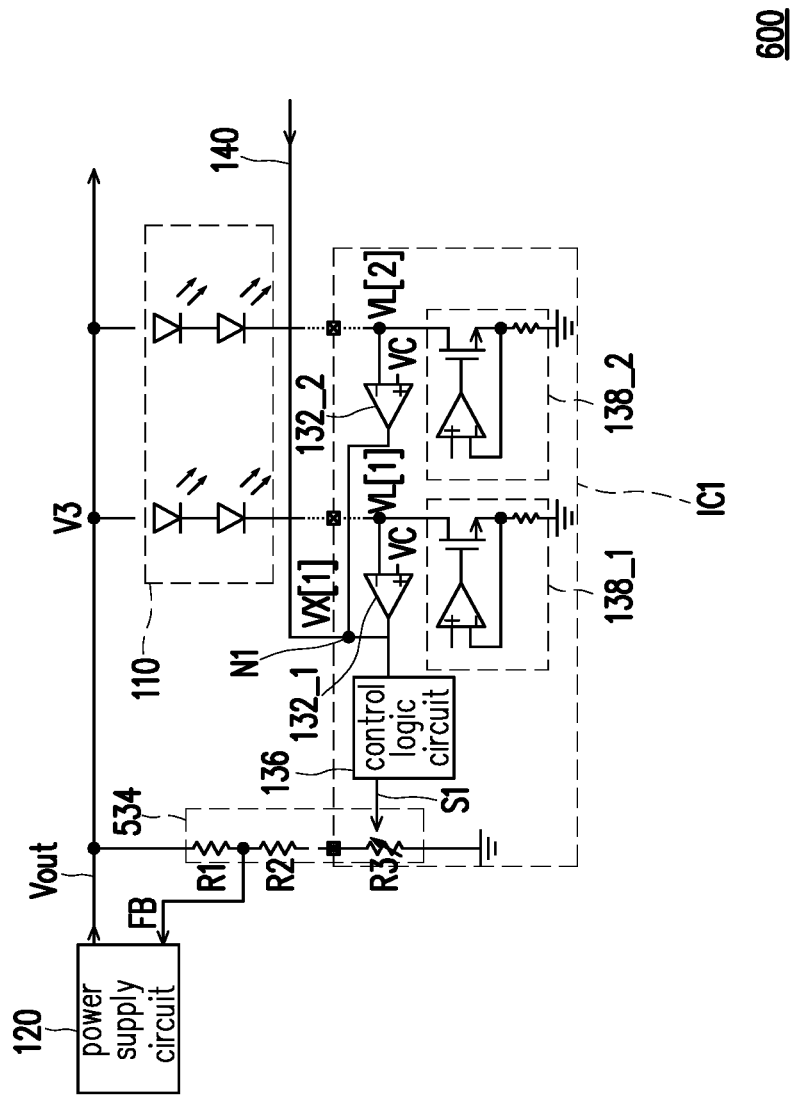
FIG. 10 illustrates a schematic diagram of a light-emitting diode driving system according to another embodiment of the invention.

FIG. 10 illustrates a schematic diagram of a light-emitting diode driving system according to another embodiment of the invention. Referring to FIG. 8 and FIG. 10, the light-emitting diode driving system 600 of the present embodiment is similar to the light-emitting diode driving system 500 depicted in FIG. 8, and the main difference therebetween lies in that the light-emitting diode driving device 630 simply includes the LED driving device IC1 that outputs the second voltages VX[1].

Figure 11:
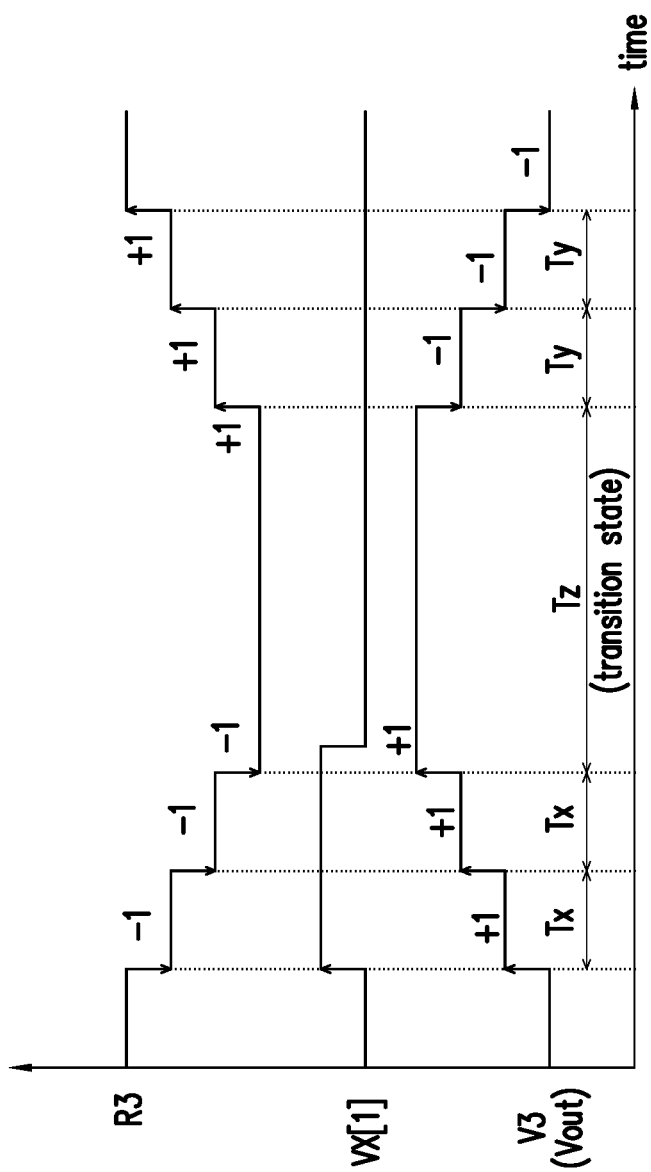
FIG. 11 illustrates a waveform diagram of some signals of the LED driving system depicted in FIG. 10.

FIG. 11 illustrates a waveform diagram of some signals of the LED driving system depicted in FIG. 10. Referring to FIG. 10 and FIG. 11, the resistance value of the third resistor R3, the output voltage Vout and the third voltage V3 change in a stepwise manner as shown in FIG. 9. The control logic circuit 136 converts the second voltage VX[1] into the control signal S1 that adjusts the resistance value of the third resistor R3.

In the present embodiment, if any of the first voltage VL[1] and VL[2] is smaller than the reference voltage VC, the second voltages VX[1] and VX[2] of the logical high are inputted to the control logic circuit 136, and the control logic circuit 136 decreases the resistance value of the third resistor R3 by the control signal S1, such that the output voltage Vout and the third voltage V3 increase. If the first voltage VL[1] and VL[2] are larger than or equal to the reference voltage VC, the second voltages VX[1] and VX[2] of the logical low are inputted to the control logic circuit 136, and the control logic circuit 136 increases the resistance value of the third resistor R3 by the control signal S1, such that the output voltage Vout and the third voltage V3 decrease.

Figure 12:
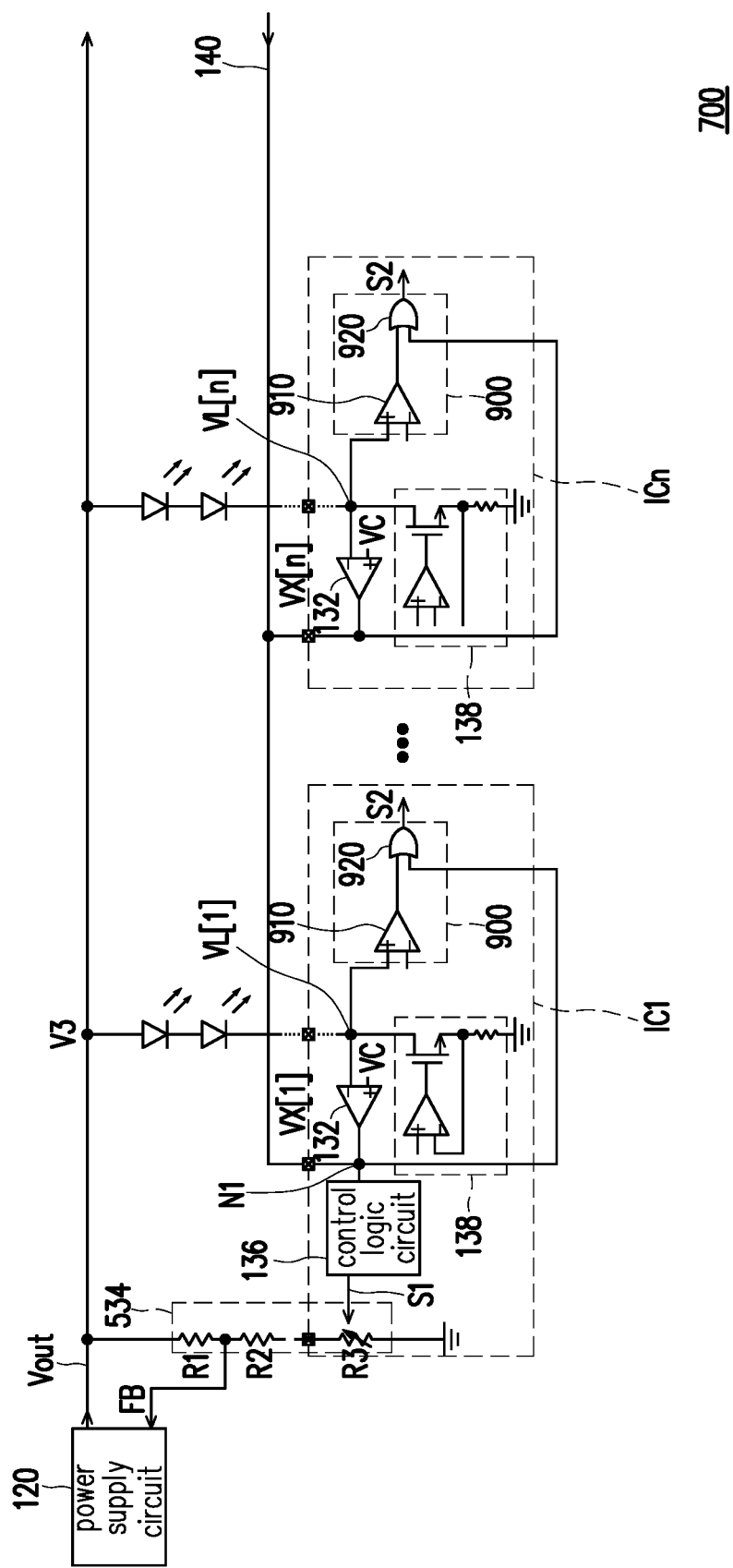
FIG. 12 illustrates a schematic diagram of a light-emitting diode driving system according to another embodiment of the invention.

FIG. 12 illustrates a schematic diagram of a light-emitting diode driving system according to another embodiment of the invention. Referring to FIG. 10 and FIG. 12, the light-emitting diode driving system 700 of the present embodiment is similar to the light-emitting diode driving system 500 depicted in FIG. 8, and the main difference therebetween lies in that each of the LED driving devices IC1 to ICn further includes an error protection circuit 900.

The error protection circuit 900 detects the second voltage VX[1], VX[2], . . . or VX[n] and generate an error protection signal S2. The error protection circuit 900 may include a comparator 910 and a NOR gate 920. The comparator 910 may be used for short LED detection. The NOR gate 920 receives the second voltage VX[1], VX[2], . . . or VX[n] on the control line 140 and an output signal of the comparator 910 and generates an error protection signal S2. In response to the voltage level of the control line 140 that is pulled to the logical high, the LED driving device 730 can stop a protection function, e.g., a short LED protection function, by the error protection signal S2. In such a way, the LED driving device 730 can avoid erroneously enabling the protection function.

In summary, the power supply circuit outputs the output voltage to drive the load according to the feedback signal. The feedback signal is generated according to a divided voltage generated by the variable resistor circuit, and the variable resistance is controlled by the control logic circuit. Accordingly, the increments or decrements of the output voltage are substantially the same, and the output voltage does not suddenly rise up or fall down, such that the power supply circuit keeps in a stable state. The power supply circuit has a good stability. In addition, the LED driving device may further include an error protection circuit to avoid erroneously enabling a protection function.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A light-emitting diode driving system, comprising:
a first load comprising one or more light-emitting diode strings;
a power supply circuit configured to output an output voltage to drive the first load according to a feedback signal; and
a first light-emitting diode driving device comprising:
at least one first current source configured to output a first current to drive the first load, and coupled in series to the first load, wherein the at least one first current source comprises a transistor and an operational amplifier having an output terminal coupled to a gate of the transistor, and the first current of the at least one first current source for driving the first load is determined by a current flowing through the transistor;
at least one first comparator configured to compare a first voltage from the at least one first current source to a reference voltage and output a second voltage including a logical high indication or a logical low indication according to a first comparison result;
a control logic circuit comprising a control node and coupled to the at least one first comparator through the control node, wherein the control logic circuit is configured to receive the second voltage including the logical high indication or the logical low indication through the control node and convert the second voltage including the logical high indication or the logical low indication to a control signal to adjust a resistance value of a variable resistor circuit, wherein the variable resistor circuit is configured to output the feedback signal according to the control signal; and
an error protection circuit, coupled to the control node of the control logic circuit and configured to decide whether to stop a short-circuit protection function of the first load according to a voltage level of the control node.

2. The light-emitting diode driving system as claimed in claim 1, wherein the variable resistor circuit comprises at least two resistors coupled in series, and a resistance value of one of the at least two resistors is variable, and the resistor which has a variable resistance value is either disposed in the first light-emitting diode driving device or outside the first light-emitting diode driving device.

3. The light-emitting diode driving system as claimed in claim 2, wherein the at least two resistors comprise a first resistor and a second resistor coupled in series, and the resistance value of the first resistor is variable, wherein one end of the first resistor is coupled to a first end of the power supply circuit that outputs the output voltage, and the other end of the first resistor is coupled to a second end of the power supply circuit that receives the feedback signal.

4. The light-emitting diode driving system as claimed in claim 3, wherein when any of the first voltage is smaller than the reference voltage, the control logic circuit increases the resistance value of the first resistor by the control signal, and the output voltage increases; and when all of the first voltages are larger than or equal to the reference voltage, the control logic circuit decreases the resistance value of the first resistor by the control signal, and the output voltage decreases.

5. The light-emitting diode driving system as claimed in claim 2, wherein the at least two resistors comprise a first resistor and a second resistor coupled in series, and the resistance value of the second resistor is variable, wherein one end of the second resistor is coupled to one end of the power supply circuit that receives the feedback signal, and the other end of the second resistor is coupled to a ground voltage.

6. The light-emitting diode driving system as claimed in claim 5, wherein when any of the first voltage is smaller than the reference voltage, the control logic circuit decreases the resistance value of the second resistor by the control signal, and the output voltage increases; and when all of the first voltages are larger than or equal to the reference voltage, the control logic circuit increases the resistance value of the second resistor by the control signal, and the output voltage decreases.

7. The light-emitting diode driving system as claimed in claim 1, further comprising:
a second load comprising one or more light-emitting diode strings; and
a second light-emitting diode driving device comprising:
at least one second current source configured to output a current to drive the second load; and
at least one second comparator configured to compare a third voltage from the at least one second current source to the reference voltage and output a fourth voltage according to a second comparison result to the control node of the control logic circuit of the first light-emitting diode driving device.

8. A light-emitting diode driving device, comprising:
at least one current source configured to output a first current to drive a load and coupled in series to the load, wherein the at least one current source comprises a transistor and an operational amplifier having an output terminal coupled to a gate of the transistor, and the first current of the at least one current source for driving the load is determined by a current flowing through the transistor, wherein the load comprises one or more light-emitting diode strings and is driven by an output voltage outputted by a power supply circuit;
at least one comparator configured to compare a first voltage from the current source to a reference voltage and output a second voltage including a logical high indication or a logical low indication according to a comparison result;
a control logic circuit comprising a control node and coupled to the at least one comparator through the control node, wherein the control logic circuit is configured to receive the second voltage including a logical high indication or a logical low indication through the control node and convert the second voltage including the logical high indication or the logical low indication to a control signal to adjust a resistance value of a variable resistor circuit, wherein the variable resistor circuit is configured to output a feedback signal according to the control signal to the power supply circuit; and
an error protection circuit, coupled to the control node of the control logic circuit and configured to decide whether to stop a short-circuit protection function of the first load according to a voltage level of the control node.

9. The light-emitting diode driving device as claimed in claim 8, wherein the variable resistor circuit comprises at least two resistors coupled in series, and a resistance value of one of the at least two resistors is variable, and the resistor which has a variable resistance value is either disposed in the first light-emitting diode driving device or outside the first light-emitting diode driving device.

10. The light-emitting diode driving device as claimed in claim 9, wherein the at least two resistors comprise a first resistor and a second resistor coupled in series, and the resistance value of the first resistor is variable, wherein one end of the first resistor is coupled to a first end of the power supply circuit that outputs the output voltage, and the other end of the first resistor is coupled to a second end of the power supply circuit that receives the feedback signal.

11. The light-emitting diode driving device as claimed in claim 10, wherein when any of the first voltage is smaller than the reference voltage, the control logic circuit increases the resistance value of the first resistor by the control signal, and the output voltage increases; and when all of the first voltages are larger than or equal to the reference voltage, the control logic circuit decreases the resistance value of the first resistor by the control signal, and the output voltage decreases.

12. The light-emitting diode driving device as claimed in claim 9, wherein the at least two resistors comprise a first resistor and a second resistor coupled in series, and the resistance value of the second resistor is variable, wherein one end of the second resistor is coupled to one end of the power supply circuit that receives the feedback signal, and the other end of the second resistor is coupled to a ground voltage.

13. The light-emitting diode driving device as claimed in claim 12, wherein when any of the first voltage is smaller than the reference voltage, the control logic circuit decreases the resistance value of the second resistor by the control signal, and the output voltage increases; and when all of the first voltages are larger than or equal to the reference voltage, the control logic circuit increases the resistance value of the second resistor by the control signal, and the output voltage decreases.

* * * * *